US006497732B1

(12) United States Patent
Soane et al.

(10) Patent No.: US 6,497,732 B1
(45) Date of Patent: Dec. 24, 2002

(54) FIBER-REACTIVE POLYMERIC DYES

(75) Inventors: David S. Soane, Piedmont, CA (US); Matthew R. Linford, Orem, UT (US); Ryan Lau, Berkeley, CA (US); Eric Green, Oakland, CA (US)

(73) Assignee: Nano-Tex, LLC, Emeryville, CA (US)

( * ) Notice: Subject to any disclaimer, the term of this patent is extended or adjusted under 35 U.S.C. 154(b) by 102 days.

(21) Appl. No.: 09/795,855

(22) Filed: Feb. 27, 2001

Related U.S. Application Data

(60) Provisional application No. 60/185,260, filed on Feb. 28, 2000.

(51) Int. Cl.[7] .................. C09B 62/00; C09B 69/10; C09B 67/00
(52) U.S. Cl. .................. 8/543; 8/647; 8/557; 8/558
(58) Field of Search .................. 8/543, 647, 557, 8/558

(56) References Cited

U.S. PATENT DOCUMENTS

| | | | |
|---|---|---|---|
| 2,371,052 A | * | 3/1945 | Kirby |
| 3,232,691 A | * | 2/1966 | Wilhelm |
| 3,940,503 A | * | 2/1976 | Bellanca |
| 4,167,422 A | * | 9/1979 | Bellanca et al. |
| 5,190,586 A | | 3/1993 | Mizuguchi et al. ......... 106/499 |
| 5,244,994 A | * | 9/1993 | Lineham |
| 6,361,916 B1 | * | 3/2002 | Chen et al. |

FOREIGN PATENT DOCUMENTS

| WO | WO 01/06054 | 1/2001 |
|---|---|---|

OTHER PUBLICATIONS

U.S. patent application Ser. No. 09/731,431, filed Dec. 6, 2000, pending.

* cited by examiner

*Primary Examiner*—Margaret Einsmann
(74) *Attorney, Agent, or Firm*—Jacqueline S. Larson

(57) ABSTRACT

The invention is directed to fiber-reactive polymeric dyes, which comprise a dye covalently bound to a carboxyl-containing polymer. By "fiber-reactive" is meant that the polymeric dye will form a chemical covalent bond with the fiber, textile, or web to be treated, via functional groups for binding or attachment to the fibers of the webs to be dyed. The invention also encompasses textile dye preparations comprising a solution or suspension of the fiber-reactive polymeric dye. The resulting polymeric dye preparations have improved colorfastness and retention on the textile or web fiber structure, even after a large number of washings. The textiles or webs treated with the fiber-reactive dye are also included in the invention.

19 Claims, No Drawings

FIBER-REACTIVE POLYMERIC DYES

This application claims the benefit of co-pending Provisional patent application Ser. No. 60/185,260, filed on Feb. 28, 2000, the entire disclosure of which is incorporated herein by reference.

FIELD OF THE INVENTION

The present invention is directed to the field of fiber and textile dyeing. More specifically, this invention relates to polymeric dyes and their use in providing substantially permanent retention of dye color in textiles. Such polymeric dyes may also improve the hand of the fabric.

BACKGROUND OF THE INVENTION

Dye retention on fabrics is important to retain the original shade of the garment. There are a number of different classes of dyes that are used to color cotton and other cellulosics. One group is the direct dyes. These are dyes that are typically inexpensive, water-soluble and have large, planar aromatic structures. The cloth is simply dipped in a solution of the dye, padded, dried, and then washed. While cost of the dyestuff and dye application is low, the washfastness (dye retention following laundering) is poor.

Reactive dyes are dyes containing reactive groups, often derivatives of cyanuric chloride or containing vinyl sulfone groups (or those that can be converted into vinyl sulfones). In dyeing, cotton is typically padded with caustic and dried, and then padded with the reactive dye and dried, and finally heated/steamed for about 15 minutes and washed. The washfastness of reactive dyes is much higher than that of direct dyes. However, application is more complex and costly and the dyes are more expensive.

Vat dyes are applied in a reduced and alkali-soluble form (the leuco form). They revert back to their insoluble structures upon exposure to air. Disadvantages of this technology include the need for a reducing agent and possible poor washfastness, as there is no chemical bond between the fiber and the dye. Sodium hydrosulfite, which is commonly used as the reductant, is fairly expensive and may be an environmental hazard.

Sulfur dyes are important for cotton, although their structures are often poorly defined. They can often be applied in a water-soluble form: dye-S—$SO_3Na$ (dye-thiosulfate) in the presence of sodium sulfide. When heated, the sulfide ion causes a coupling of the dyes to occur via an S—S bond through a loss of the —$SO_3Na$ group. The loss of these hydrophilic groups decreases the solubility of the product. If there is more than one thiosulfate group on the dye molecule, an insoluble polymer may be produced. However, in general no covalent bond to the fiber is made.

To dye nylon (and wool), acid dyes are commonly used. Acid dyes are named as such because they are applied from weakly acidic baths (pH 2–6). Chemically, the functional groups on these dyes are usually the same as those found in the direct dyes, including sulfonate, hydroxyl, amine, and nitro groups. Like the direct and reactive dyes, these dyes are usually water-soluble and are often synthesized via azo coupling chemistry. Acid dyes dye wool through an ion exchange mechanism. Because wool is drycleaned with organic solvents, the water solubility of these dyes does not usually present a problem.

Polymeric dyes have been disclosed for use in the food industry, because they are not readily absorbed by the body when eaten, and for use in printing inks.

SUMMARY OF THE INVENTION

This invention is directed to textile dye preparations useful for the permanent or substantially permanent dyeing of textiles and other webs.

More particularly, the invention is directed to fiber-reactive polymeric dyes, which comprise a dye covalently bound to a carboxyl-containing polymer. By "fiber-reactive" is meant that the polymeric dye will form a chemical covalent bond with the fiber, textile, or web to be treated, via functional groups for binding or attachment to the fibers of the textiles or other webs to be dyed. The invention also encompasses textile dye preparations comprising a solution or suspension of the fiber-reactive polymeric dye. The resulting polymeric dye preparations have improved colorfastness and retention on the textile or web fiber structure, even after a large number of washings.

The invention is further directed to the process for treating textiles and other webs with the fiber-reactive polymeric dyes, wherein the fiber-reactive polymeric dye preparation is applied to the fiber, yarn, textile, or other web. In a presently preferred embodiment, the application process is a dip-pad-cure process. That is, the web is placed into the dye preparation (dipped), then padded and cured in a single continuous process. This greatly increases the efficiency of the treatment.

This invention is further directed to the yarns, fibers, fabrics, textiles, finished goods, or nonwovens (encompassed herein under the terms "textiles" and "webs") treated with the fiber-reactive polymeric dye preparation. Such textiles and webs comprise a covalently attached polymeric dye and exhibit a greatly improved colorfastness and resistance to fading in comparison to textiles and webs treated by prior art dyes, even after multiple launderings.

DETAILED DESCRIPTION OF THE INVENTION

The textile-reactive preparation of the invention comprises a combination of a dye and a carboxyl-containing polymer to give polymeric dyes that are reactive to the fibers of textiles or other webs. The polymeric dye includes functional groups for binding or attachment to the fibers of the textiles to be treated. The resulting fiber-reactive polymeric dye preparations have improved colorfastness and retention on the textile or web fiber structure.

The polymeric dyes of the invention are formed, in one embodiment, by dispersing a carboxyl-reactive dye and a carboxyl-containing polymer in a suitable solvent. The reaction solution may be, and preferably is heated. The dye and the polymer react together by covalent bonding to give a fiber-reactive polymeric dye.

The term "carboxyl-reactive dye" as used herein refers to a water-soluble dye that contains groups that can react with carboxyl groups. Such carboxyl-reactive groups include amine, hydroxyl, vinyl sulfone, C—Cl in cyanuric chloride, and the like, which groups are well-known to those skilled in the art. The dye may be a direct dye or an acid dye, which are easily obtained and are inexpensive, but which do not normally exhibit good colorfastness. However, any dye with the appropriate reactive groups may be used in this invention, including disperse dyes, mordant dyes, solvent dyes, and pigments.

The term "carboxyl-containing polymer" as used herein refers to a polymer that contains carboxyl groups. The number of carboxyl groups on the polymer should be such that there will be sufficient carboxyl groups remaining after reaction with the carboxyl-reactive dye so that the groups can be re-formed into a reactive anhydride by a catalyst when the catalyst and the fiber-reactive polymeric dye are heated in the presence of a material that contains hydroxyls or amines (such as, for example, cotton or wool). Such polymers include, but are not limited to, poly(acrylic acid) and copolymers that contain acrylic acid, methacrylic acid, maleic acid, maleic anhydride, itaconic acid, and itaconic anhydride, for example. In a presently preferred embodiment, the polymers are of low molecular weight; that is, they will have a molecular weight of less than 10,000. In another preferred embodiment, the polymer is poly(acrylic acid), which is inexpensive and readily available. In yet another preferred embodiment, the polymer is a copolymer of butadiene/maleic anhydride ("maleinized polybutadiene"), which in addition to being inexpensive also gives a superior hand to the treated textile.

In one example of the preparation of a fiber-reactive polymeric dye, maleinized butadiene and a carboxyl-reactive dye are dissolved in a solvent such as methylethylketone or tetrahydrofuran. The mixture is then refluxed until reaction occurs, or the solvent is removed by rotary evaporation and the mixture is heated to drive a reaction. In a second example, polyacrylic acid and a carboxyl-reactive dye are dissolved in water, after which the water is evaporated off at elevated temperature and the dye/polymer mixture is heated to drive a reaction.

In another embodiment of the invention, the fiber-reactive dyes are prepared by first reacting a reactive monomer (such as glycidyl methacrylate, (meth)acryloyl chloride, maleic anhydride, or itaconic anhydride) with an aromatic hydroxyl or amine group on a dye molecule. This composite molecule is then polymerized (by heating, for example) with a carboxyl-containing polymer to give the fiber-reactive polymeric dye. In a presently preferred embodiment, the reactive monomer is glycidyl methacrylate, which is not expected to significantly shift the color of the dye when it reacts with the dye, and the carboxyl-containing polymer is poly(acrylic acid) or maleinized polybutadiene.

In yet another embodiment, the fiber-reactive dyes are prepared by reacting poly(vinyl alcohol) ("PVA") and a commercially available reactive dye, after which this composite dye-PVA polymer is mixed together with a carboxyl-containing polymer in aqueous solution and applied to a web to be treated. Upon cure, the carboxyl-containing polymer will act to attach the dye-PVA polymer to the fiber. In a presently preferred embodiment, the carboxyl-containing polymer is poly(acrylic acid) or a copolymer of acrylic acid/maleic acid.

In reacting together the dye and the carboxyl-containing polymer to give the fiber-reactive polymeric dye preparation of the invention, the pH range should be chosen to be compatible with the reactants. For example, where the dye contains amines or hydroxyls and the system is heated to drive the reaction, a pH of 2–4.5 is preferred. Where the dye is a commercially available reactive dye, a higher pH of about 3–8 is preferred to bind the dye to the polymer.

The present invention is further directed to the yarns, fibers, fabrics, finished goods, or other textiles (encompassed herein under the terms "textiles" and "webs") treated with the fiber-reactive polymeric dye. These textiles or webs will display improved colorfastness and retention on the textile or web fiber structure, even after multiple launderings.

The colorfast webs of the present invention are intended to include fabrics and textiles, and may be a sheet-like structure (woven, knitted, tufted, stitch-bonded, or non-woven) comprised of fibers or structural elements. Included with the fibers can be non-fibrous elements, such as particulate fillers, binders, sizes and the like. The textiles or webs include fibers, woven and non-woven fabrics derived from natural or synthetic fibers or blends of such fibers, as well as cellulose-based papers, and the like. They can comprise fibers in the form of continuous or discontinuous monofilaments, multifilaments, staple fibers, and yarns containing such filaments and/or fibers, which fibers can be of any desired composition. The fibers can be of natural or synthetic origin. Mixtures of natural fibers and synthetic fibers can also be used. Examples of natural fibers include cotton, wool, silk, jute, linen, and the like. Examples of man-made fibers include regenerated cellulose rayon, cellulose acetate, and regenerated proteins. Examples of synthetic fibers include polyesters (including polyethyleneterephthalate), polyamides (including nylon), acrylics, olefins, aramids, azions, modacrylics, novoloids, nytrils, aramids, spandex, vinyl polymers and copolymers, vinal, vinyon, Kevlar®, and the like.

To prepare the colorfast webs, the fiber, the yarn, the fabric, or the finished good is exposed (by methods known in the art such as by soaking, spraying, dipping, fluid-flow, padding, and the like) to an aqueous solution of the fiber-reactive polymeric dye. If needed for the reaction, a catalyst, such as for example an anhydride-reforming catalyst, is also present in the solution. The treated web is then removed from the solution, dried, and cured. The fiber-reactive functional groups on the carboxyl-containing polymer react, by covalent bonding, with the textile or web during cure (which is preferably through heating) to permanently attach to the textile. This can be a one-step, continuous process, which has the advantages of being much faster and less expensive than the prior art piece-dyeing processes. The concentration of the fiber-reactive polymeric dye in solution can be from about 0.01% to about 30.0%, preferably from about 0.05% to about 5.0%; depending, however, on the characteristics of the particular polymeric dye selected and on the amount of color intensity desired.

Additional additives may be included in the fiber-reactive polymeric dye bath. For example, a hydroxyl-containing polymer, such as poly(vinyl alcohol) or starch, may be added to help improve colorfastness. Softeners, such as maleinized polybutadiene for example, or surfactants may also be added.

In applying the fiber-reactive polymeric dye preparation of the invention to the web to be treated, the pH range should be chosen to be compatible with the reactants. For example, in the cases of a maleinized butadiene or polyacrylic acid polymeric dye system, the pH of the dye bath is preferably between 0.5 and 7.0, more preferably between 2.5 and 4.0. The process (cure) temperature can vary widely, depending on the reactivity of the reactants. However, the temperature should not be so high as to decompose the reactants or so low as to cause inhibition of the reaction or freezing of the solvent. Unless specified to the contrary, the curing process described herein takes place at atmospheric pressure over a temperature range from about 110° C. to about 250° C. The time required for the processes herein will depend to a large extent on the temperature being used and the relative reactivities of the starting web and fiber-reactive polymeric dye. Unless otherwise specified, the process times and conditions are intended to be approximate.

A significant advantage of using dyes that are pendant on maleinized polybutadiene, poly(acrylic acid), or a similar polymer is that the resulting polymeric dye can be precipitated by use of an inexpensive polycation, thus cheaply, easily, and significantly reducing problems with waste water treatment. Suitable polycationic polymers include those that contain positively charged groups such as poly(allylamine) hydrochloride, poly(ethylenimine), poly(diallyidimethylammonium chloride), and chitosan.

In order to further illustrate the present invention and advantages thereof, the following specific examples are given, it being understood that the same are intended only as illustrative and in nowise limitative.

EXAMPLES

Example 1

1 Gram of mordant yellow 12 dye (Aldrich, 30%) was mixed with 6.7 g of polyacrylic acid (65 wt %, 1800 MW) and 52.6 g of water. After filtering, the solution was allowed to dry in an oven at 120° C. and was then baked at 200° C. for 30 min. The mixture was then redissolved in water to the same weight as before and 0.6 g $NaH_2PO_2$ was added to it. Cotton twill was then dipped in this solution, padded at 25 lbs. pressure, and dried and cured for 15 min at 180° C. in a Despatch oven. The color of the resulting cotton samples was ivory and they exhibited excellent washfastness to 30 home launderings ("HLs").

Example 2

0.8 Gram of naphthol blue black dye (Aldrich, 80%) was mixed with 128.3 g water and 21 g of a 50 wt % solution of a 1:1 copolymer of acrylic acid and maleic acid (3000 MW). The solution was divided in half and the water was driven off at 120° C.

Soln. A. Half of the above dried material was cured for 30 min. at 180° C., after which the water was replaced to the same weight and the dye solution was applied to cloth, as in Example 1. The resulting fabric was dark purple and had excellent washfastness to 30 HLs.

Soln. B. Half of the above dried material was cured for 5 min. at 220° C., the water was replaced and the dye solution was applied to cloth, as in Example 1. The resulting fabric was blue and had excellent washfastness to 30 HLs.

What is claimed is:

1. A polymeric dye comprising a dye covalently bound to a carboxyl-containing copolymer of butadiene/maleic anhydride, the polymeric dye being fiber-reactive.

2. A polymeric dye according to claim 1 wherein the dye is a carboxyl-reactive dye.

3. A polymeric dye according to claim 2 wherein the carboxyl-reactive dye is a composite dye-PVA polymer, which polymer is synthesized by reacting poly(vinyl alcohol) and a commercially available reactive dye.

4. A polymeric dye according to claim 2 wherein the carboxyl-reactive dye is synthesized by reacting a reactive monomer with a dye comprising aromatic hydroxyl or amine groups.

5. A polymeric dye according to claim 4 wherein the reactive monomer is selected from the group consisting of glycidyl methacrylate, acryloyl chloride, methacryloyl chloride, maleic anhydride, and itaconic anhydride.

6. A method of synthesizing a fiber-reactive polymeric dye comprising:
reacting a reactive monomer with a dye comprising aromatic hydroxyl or amine groups to synthesize a carboxyl-reactive dye, wherein the reactive monomer is selected from the group consisting of glycidyl methacrylate, acryloyl chloride, methacryloyl chloride, maleic anhydride, and itaconic anhydride;
dispersing the carboxyl-reactive dye and a carboxyl-containing polymer in a suitable solvent; and
heating the reaction solution such that the dye and the polymer react together by covalent bonding to give a fiber-reactive polymeric dye.

7. A method according to claim 6 wherein the carboxyl-containing polymer is selected from the group consisting of poly(acrylic acid) and copolymers that contain acrylic acid, methacrylic acid, maleic acid, maleic anhydride, itaconic acid, and itaconic anhydride.

8. A method according to claim 6 wherein the carboxyl-containing polymer is poly(acrylic acid).

9. A method according to claim 6 wherein the carboxyl-containing polymer is a copolymer of butadiene/maleic anhydride.

10. A method of synthesizing a fiber-reactive polymeric dye comprising:
dispersing a carboxyl-reactive dye and a carboxyl-containing copolymer of butadiene/maleic anhydride in a suitable solvent; and
heating the reaction solution such that the dye and the polymer react together by covalent bonding to give a fiber-reactive polymeric dye.

11. A method according to claim 10 which comprises a further step of reacting poly(vinyl alcohol) and a commercially available reactive dye to synthesize a composite dye-PVA polymer as the carboxyl-reactive dye.

12. A web comprising a covalently attached polymeric dye, wherein the polymeric dye comprises a carboxyl-reactive dye covalently bound to a carboxyl-containing copolymer of butadiene/maleic anhydride.

13. A web according to claim 12 wherein the carboxyl-reactive dye is a composite dye-PVA polymer, which polymer is synthesized by reacting poly(vinyl alcohol) and a commercially available reactive dye.

14. A web according to claim 12 wherein the carboxyl-reactive dye is synthesized by reacting a reactive monomer with a dye comprising aromatic hydroxyl or amine groups.

15. A web according to claim 14 wherein the reactive monomer is selected from the group consisting of glycidyl methacrylate, acryloyl chloride, methacryloyl chloride, maleic anhydride, and itaconic anhydride.

16. A dye preparation comprising a solution or suspension of a fiber-reactive polymeric dye, the polymeric dye comprising a carboxyl-reactive dye covalently bound to a carboxyl-containing copolymer of butadiene/maleic anhydride.

17. A dye preparation according to claim 16 wherein the carboxyl-reactive dye is a composite dye-PVA polymer, which polymer is synthesized by reacting poly(vinyl alcohol) and a commercially available reactive dye.

18. A dye preparation according to claim 16 wherein the carboxyl-reactive dye is synthesized by reacting a reactive monomer with a dye comprising aromatic hydroxyl or amine groups.

19. A dye preparation according to claim 18 wherein the reactive monomer is selected from the group consisting of glycidyl methacrylate, acryloyl chloride, methacryloyl chloride, maleic anhydride, and itaconic anhydride.

* * * * *